US008490070B2

(12) United States Patent
Diez et al.

(10) Patent No.: US 8,490,070 B2
(45) Date of Patent: Jul. 16, 2013

(54) UNIFIED MOBILE PLATFORM

(75) Inventors: Daniel Diez, Zurich (CH); Davide Mancuso, Zurich (CH)

(73) Assignee: Myriad Group AG, Dubendorf (CH)

( * ) Notice: Subject to any disclaimer, the term of this patent is extended or adjusted under 35 U.S.C. 154(b) by 1687 days.

(21) Appl. No.: 11/601,464

(22) Filed: Nov. 16, 2006

(65) Prior Publication Data

US 2007/0168953 A1    Jul. 19, 2007

Related U.S. Application Data

(60) Provisional application No. 60/737,452, filed on Nov. 16, 2005.

(51) Int. Cl.
*G06F 9/44* (2006.01)
*G06F 9/45* (2006.01)

(52) U.S. Cl.
USPC ............ 717/147; 717/118; 717/140; 717/151

(58) Field of Classification Search
None
See application file for complete search history.

(56) References Cited

U.S. PATENT DOCUMENTS

| | | | | |
|---|---|---|---|---|
| 6,092,147 | A * | 7/2000 | Levy et al. ........................ 711/6 |
| 6,473,777 | B1 * | 10/2002 | Hendler et al. .................... 1/1 |
| 6,789,254 | B2 * | 9/2004 | Broussard ..................... 717/147 |
| 6,865,733 | B2 * | 3/2005 | Broussard ..................... 717/147 |
| 6,964,039 | B2 * | 11/2005 | Heeb ............................. 717/148 |
| 7,079,839 | B1 * | 7/2006 | Papineau ....................... 455/418 |
| 7,210,132 | B2 * | 4/2007 | Rivard et al. .................. 717/147 |
| 7,337,436 | B2 * | 2/2008 | Chu et al. ...................... 717/140 |
| 7,343,593 | B2 * | 3/2008 | Humpert et al. ............... 717/147 |
| 8,225,300 | B1 * | 7/2012 | Webb et al. .................... 717/151 |
| 8,266,582 | B2 * | 9/2012 | Prakash ......................... 717/147 |
| 8,276,125 | B2 * | 9/2012 | Fan et al. ....................... 717/118 |
| 8,365,157 | B2 * | 1/2013 | Lagergren ..................... 717/147 |
| 2002/0174417 | A1 * | 11/2002 | Sijacic et al. ................. 717/147 |
| 2003/0056204 | A1 * | 3/2003 | Broussard ..................... 717/140 |
| 2004/0010779 | A1 * | 1/2004 | Di Loreto ...................... 717/118 |
| 2004/0015913 | A1 | 1/2004 | Heeb |
| 2004/0158813 | A1 * | 8/2004 | Xia et al. ....................... 717/118 |
| 2005/0091650 | A1 * | 4/2005 | Heeb ............................. 717/118 |
| 2006/0026583 | A1 * | 2/2006 | Remmel et al. ............... 717/140 |
| 2006/0218536 | A1 * | 9/2006 | Kirilline et al. ............... 717/127 |
| 2007/0136719 | A1 * | 6/2007 | Lagergren ..................... 717/140 |
| 2007/0174829 | A1 * | 7/2007 | Brockmeyer et al. ......... 717/151 |
| 2007/0271554 | A1 * | 11/2007 | Fletcher et al. ............... 717/147 |
| 2007/0271555 | A1 * | 11/2007 | Heeb ............................. 717/151 |
| 2011/0119657 | A1 * | 5/2011 | Vorbach et al. ............... 717/140 |
| 2011/0154305 | A1 * | 6/2011 | LeRoux et al. ............... 717/140 |

OTHER PUBLICATIONS

Java MIDIet Developers Guide for Cisco Unified IP Phones; Cisco Unified Communications Manager, Release 8.0(1); 20100903; retrieved online on Apr. 2, 2013; pp. 1-63; Retrieved from the Internet: <URL: http://developer.cisco.com/documents/2371349/2378769/Java+MIDIet+Developer+Guide.pdf/9eb2af39-2f43-4b2e-8521-978bc134ad76>.*

(Continued)

*Primary Examiner* — Thuy Dao
*Assistant Examiner* — Hanh T Bui
(74) *Attorney, Agent, or Firm* — Soquel Group LLC

(57) ABSTRACT

The present invention teaches a variety of systems, platforms, applications, and methods, and relates to mobile platforms, embedded native applications, Java virtual machines, user interfaces, and the like. The present invention discloses a mobile platform which unifies the worlds of the Java virtual machine and native applications to provide a unified and consistent environment for multitasking both Java and native applications within a mobile device.

10 Claims, 8 Drawing Sheets

OTHER PUBLICATIONS

Anastasios Ioannidis et al., Using XML and related standards to support Location Based Services; [2004]; Published by ACM; retrieved online on Apr. 2, 2013; pp. 1629-1633; Retrieved from the Internet: <URL: http://delivery.acm.org/10.1145/970000/968226/p1629-ioannidis.pdf?ip=151.207.250.11>.*

David Page et al., Methodology Independent OO Case Tool: Supporting Methodology Engineering; [1998]; retrieved online on Apr. 2, 2013; pp. 1-8; Retrieved from the Internet: <URL: http://ieeexplore.ieee.org/stamp/stamp.jsp?tp=&arnumber=707673>.*

International Search report and Written Opinion for PCT Application PCT/IB2006/004260, 13 pages, Search report dated Feb. 12, 2008.

"Jbed CLDC: A leading Java runtime platform for Embedded Devices", Internet Article Esmertec Homepage, 6 pages, retrieved from the internet: <URL:http://www.esmertec.co.jp/company/downloads/jbed_CLDC.pdf> (Jun. 2005).

"Jbed CLDC: A leading Java runtime platform for Embedded Devices", Internet Article [online]Esmertec Homepage, 6 pages, retrieved from the internet: <URL:http://web.archive.org/web/20050512054017/www.esmertec.com/company/downloads/jbed_CLDC.pdf> (May 2005).

"Jbed Advanced A leading Java runtime platform for Embedded Devices", Internet Article [online]Esmertec Homepage, 6 pages, retrieved from the internet: <URL:http://web.archive.org/web/20050512051714/www.esmertec.com/company/downloads/jbed_CLDC.pdf> (May 2005).

The CDC application Management System Java Platfor, Micro Edition White Paper, Internet Article, Sun Microsystem Home Page, 11 pages (Jun. 2005).

* cited by examiner

UNIFIED MOBILE PLATFORM

CROSS-REFERENCE TO RELATED APPLICATION

The present application claims priority to Diez et al's provisional patent application 60/737,452, filed Nov. 16, 2005. The present application incorporates by reference Heeb's U.S. Pat. No. 6,964,039, issued Nov. 8, 2005, and Mancuso's Publication No. 2005203422, filed Aug. 3, 2005.

TECHNICAL FIELD

The present invention teaches a variety of systems, platforms, appliances, methods and relates to mobile platforms, embedded native applications, Java virtual machines, user interfaces, and the like. The present invention for example teaches a mobile platform which unifies the worlds of JAVA virtual machines and native applications at a high level by taking care of critical aspects of the native application model.

BACKGROUND OF THE INVENTION

Mobile devices such as cell phones and PDAs come with so-called native applications built in. Native applications are typically pre-installed, cannot be removed, and are ready to run. Some of the applications are always running while others are started by the user via the menu.

Users are able to further customize their mobile devices by loading additional applications (e.g., instant messaging), games, etc. onto these devices. A MIDlet is a Java program that can be loaded onto such a mobile device. In order for a Java MIDlet to be able to run on a mobile device, the device must have an embedded Java Virtual Machine ("Jbed VM"), an execution engine used to translate and execute Java bytecode into native processor instructions at run-time. Application Management Software ("AMS") on the mobile device manages the downloading of MIDlets and their lifecycle, which consists of discovery of the MIDlet, installation, update, invocation, and removal.

When an application such as a MIDlet is written, it is not necessary to provide for certain tasks common to all programs, such as, for example, drawing icons and maintaining lists of items. Libraries containing these common functions in the form of reusable code can be requested, or called, and loaded during runtime of the application. The Jbed VM interfaces with an application programming interface ("API"), which allows a software application to make such calls to a library during runtime. This relieves programmers from the trouble of rewriting the same code for many of these common functions. The API allows access to these functions without necessarily divulging the source code of the functions or library.

FIG. 1 illustrates a prior art mobile phone platform 10 enabling a JVM 12 and a plurality of other native applications 14. FIG. 2 is illustrates another prior art mobile phone, platform 20 enabling a JVM 12 and a plurality of other native applications 14. As can be seen from both FIGS. 1 and 2, the Java Virtual Machine 12 can be considered simply one of many native applications 14. Even so, there is a lack of unity between a Native Application platform 16 and the platform of applications (MIDlets) running in the JVM 12.

There exists a lack of unity between the world of the native platform running native applications and the parallel world of the Jbed VM running MIDlets within the native world. Integration of the worlds could be problematic since native applications and libraries are often written languages other than the Java programming language (such as C and C++). Additionally, multitasking a plurality of native and MIDlet applications led to problems with, for example, unfair resource allocation, misbehavior of one application affecting another application, inter-task communication, etc. Furthermore, in mobile devices where both a native graphical user interface ("GUI") and Java GUI were running, enormous customization efforts would be required on the part of developers and the end user could experience an inconsistent look and feel in both the appearance and execution of various applications.

SUMMARY OF THE INVENTION

The present invention is described and illustrated in conjunction with systems, apparatuses, and methods of varying scope. Various exemplary embodiments are described herein relating to a system that unifies the worlds of Jbed VMs and native applications in mobile devices to provide improved multitasking capability for supporting multiple Java MIDlets and native applications. In addition to the aspects of the present invention described in this summary, further aspects of the invention will become apparent by reference to the drawings and by reading the detailed description that follows.

A method and apparatus for unification of the worlds of Jbed VMs and native platforms at high and low levels in mobile devices is provided. At the lower level, unification is achieved by integrating the Java world into the native world. This is achieved by requiring a verification-compilation process during installation of a MIDlet, allowing the compiled code to be executed in the native environment like any other native application. In addition, pre-installation and pre-compilation of MIDlets ("ahead of time," or "AOT," compilation) by the AMS and Jbed VM enable MIDlets to be always-running, like their native counterparts.

The present invention further teaches unification of the Jbed VM world and native world at a higher level by integrating the native world into the Java world. This is accomplished by taking care of critical aspects of the native application model. Such aspects may include the multitasking manager, event manager, brand manager, and display manager. This Jbed Unified Mobile Platform ("JUMP") results in a single application model and single application management for Java MIDlets and native applications.

Under the JUMP, a MIDlet shell, or wrapper, encapsulates a native application such that the Jbed VM recognizes the native application as a Java MIDlet. These encapsulated native applications (virtual MIDlets) are then able to directly call Java APIs in the Jbed VM during runtime to access and use various libraries and services. Additionally, MIDlet-wrapped native applications can be controlled by the Jbed environment; in other words, they can be ported into the Java runtime. Multitasking support for running multiple Java MIDlets and native applications is built in. Finally, implementation of the graphical user interface (GUI) occurs in the Jbed VM rather than in the native application platform, and is accessible from both Java MIDlet and native applications. This does not imply major porting changes in the native applications, but only a switch to the JUMP GUI implementation in the application user interface code.

The result is a unified multitasking environment for the unified Java/native application model, with isolation and protection of the independent applications, fairness and resource management to avoid application starving, and protection of other applications against the misbehavior of one. For the end user, the multitasking experience is unified with a seamless and consistent look and feel for all applications.

BRIEF DESCRIPTION OF THE DRAWINGS

Embodiments of the invention are illustrated in the figures. However, as examples of the invention, the embodiments and figures are illustrative rather than limiting.

DETAILED DESCRIPTION OF THE PREFERRED EMBODIMENTS

Figure 1:
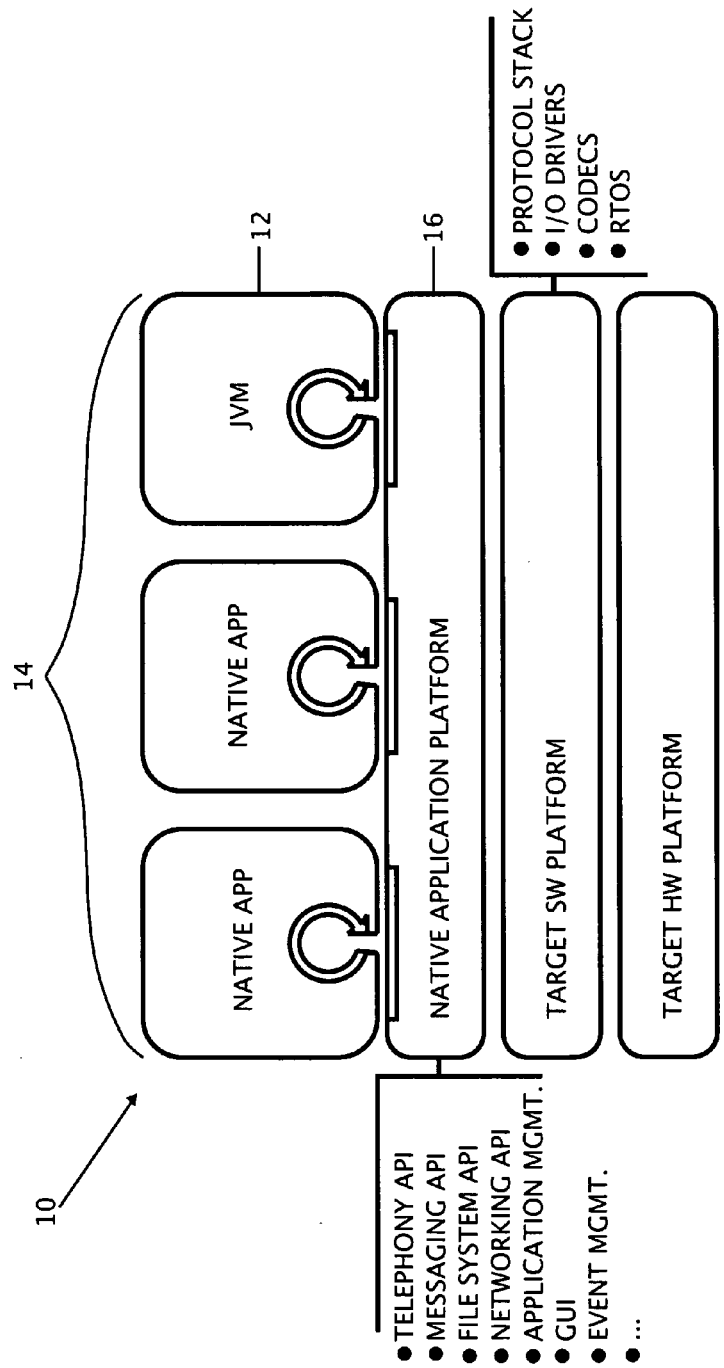
FIG. 1 illustrates a prior art mobile platform enabling a Java virtual machine and a plurality of other native applications.
Figure 2:
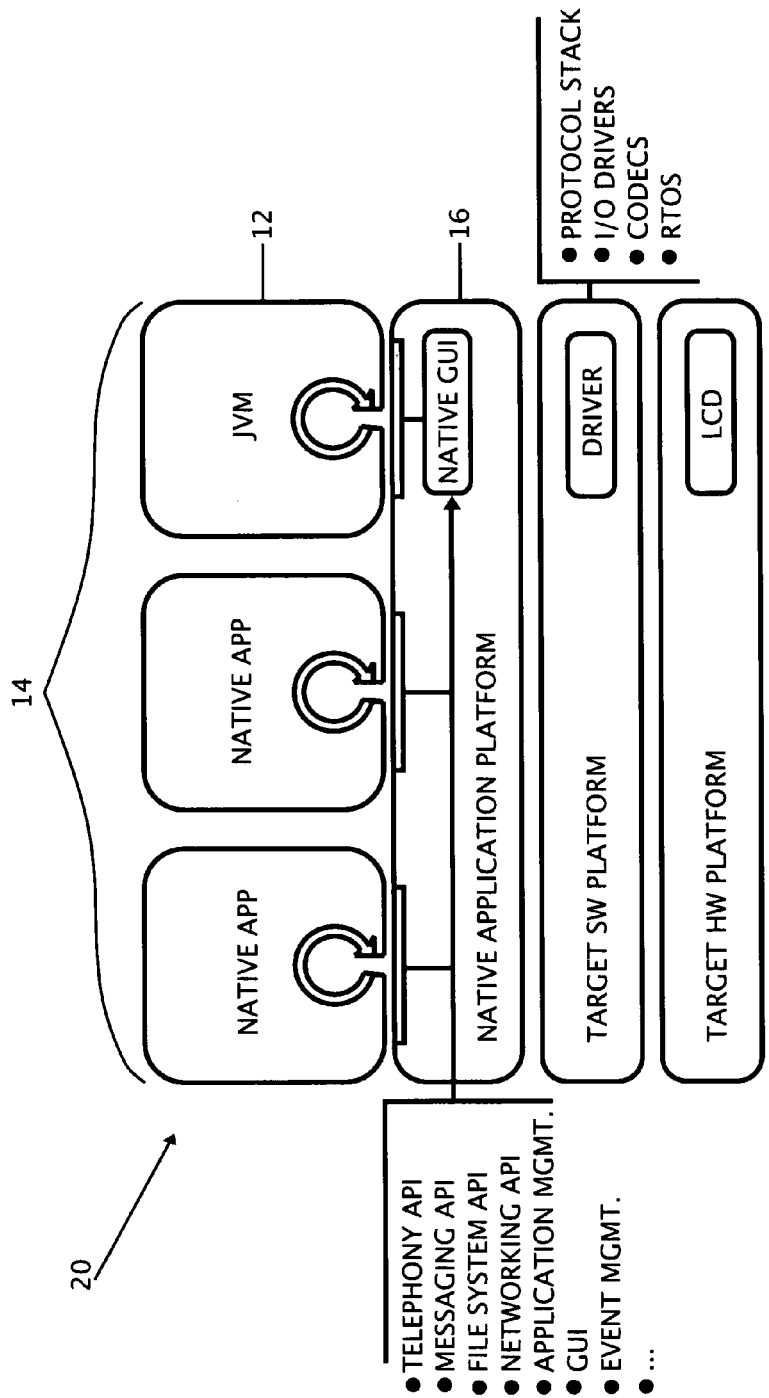
FIG. 2 illustrates another prior art mobile platform enabling a Java virtual machine and a plurality of other native applications.
Figure 3:
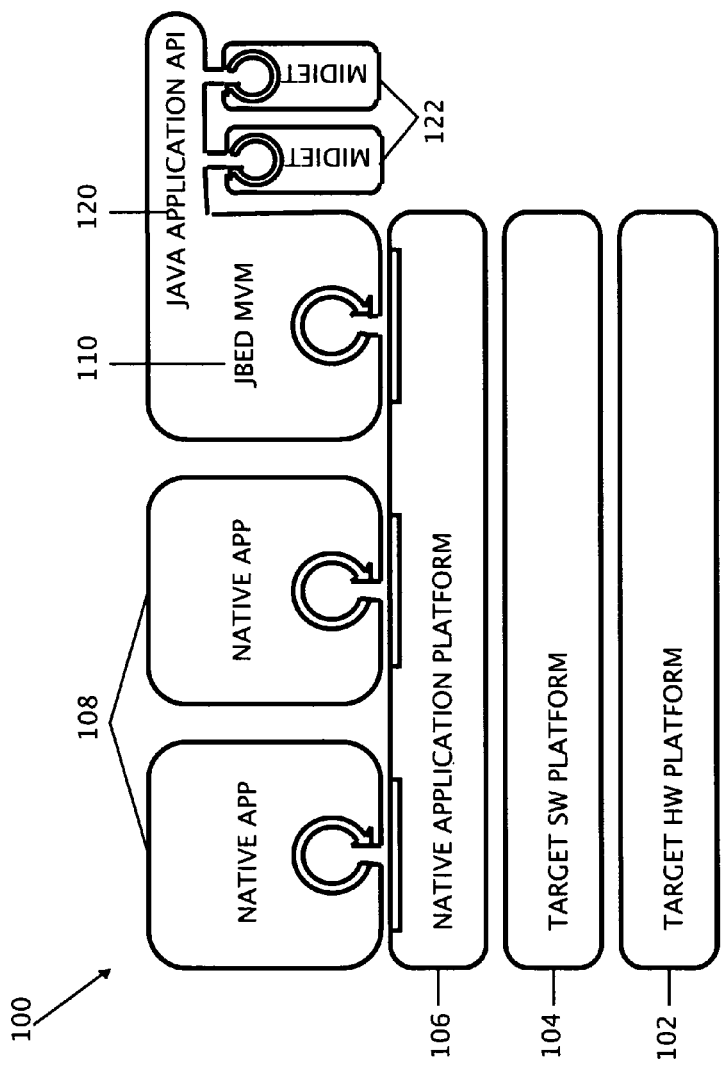
FIG. 3 is a pictorial block diagram of a Jbed mobile platform according to one aspect of the present invention.

FIG. 3 illustrates a mobile computing platform or device 100 according to one embodiment of the present invention. The mobile computing platform 100 includes a target hardware platform 102, a target software platform 104, a native application platform 106, a plurality of native applications 108, and a multitasking virtual machine ("MVM") 110. As will be appreciated, the target hardware and software platforms 102 and 104 are the native state of the mobile computer platform 100 for which the native applications 108 and the JAVA applications are intended to execute upon, whether through compilation, translation, etc.

The MVM 110 can be implemented within a virtual machine such as the JBED-FBCC virtual machine that improves upon the download process and lifecycle model by requiring a simultaneous verification-compilation process during installation of the standard MIDP-JAVA. Various exemplary embodiments are described herein relating to a system that unifies the worlds of Jbed VMs and native applications in mobile devices to provide improved multitasking capability for supporting multiple Java MIDlets and native applications. The MVM 110 includes a JAVA application API 120 that enables a plurality of MIDlets 122 to be brought into the platform 100 for native execution.

A method and apparatus for unification of the worlds of Jbed VMs and native platforms at high and low levels in mobile devices is provided. At the lower level, unification is achieved by integrating the Java world into the native world. This is achieved by requiring a verification-compilation process during installation of a MIDlet, allowing the compiled code to be executed in the native environment like any other native application. In addition, pre-installation and pre-compilation of MIDlets ("ahead of time," or "AOT," compilation) by the AMS and Jbed VM enable MIDlets to be always-running, like their native counterparts.

The present invention further teaches unification of the Jbed VM world and native world at a higher level by integrating the native world into the Java world. This is accomplished by taking care of critical aspects of the native application model. Such aspects may include the multitasking manager, event manager, brand manager, and display manager. This Jbed Unified Mobile Platform ("JUMP") results in a single application model and single application management for Java MIDlets and native applications.

Under the JUMP, a MIDlet shell, or wrapper, encapsulates a native application such that the Jbed VM recognizes the native application as a Java MIDlet. These encapsulated native applications (virtual MIDlets) are then able to directly call Java APIs in the Jbed VM during runtime to access and use various libraries and services. Additionally, MIDlet-wrapped native applications can be controlled by the Jbed environment; in other words, they can be ported into the Java runtime. Multitasking support for running multiple Java MIDlets and native applications is built in. Finally, implementation of the graphical user interface (GUI) occurs in the Jbed VM rather than in the native application platform, and is accessible from both Java MIDlet and native applications. This does not imply major porting changes in the native applications, but only a switch to the JUMP GUI implementation in the application user interface code.

The result is a unified multitasking environment for the unified Java/native application model, with isolation and protection of the independent applications, fairness and resource management to avoid application starving, and protection of other applications against the misbehavior of one. For the end user, the multitasking experience is unified with a seamless and consistent look and feel for all applications.

Figure 4:
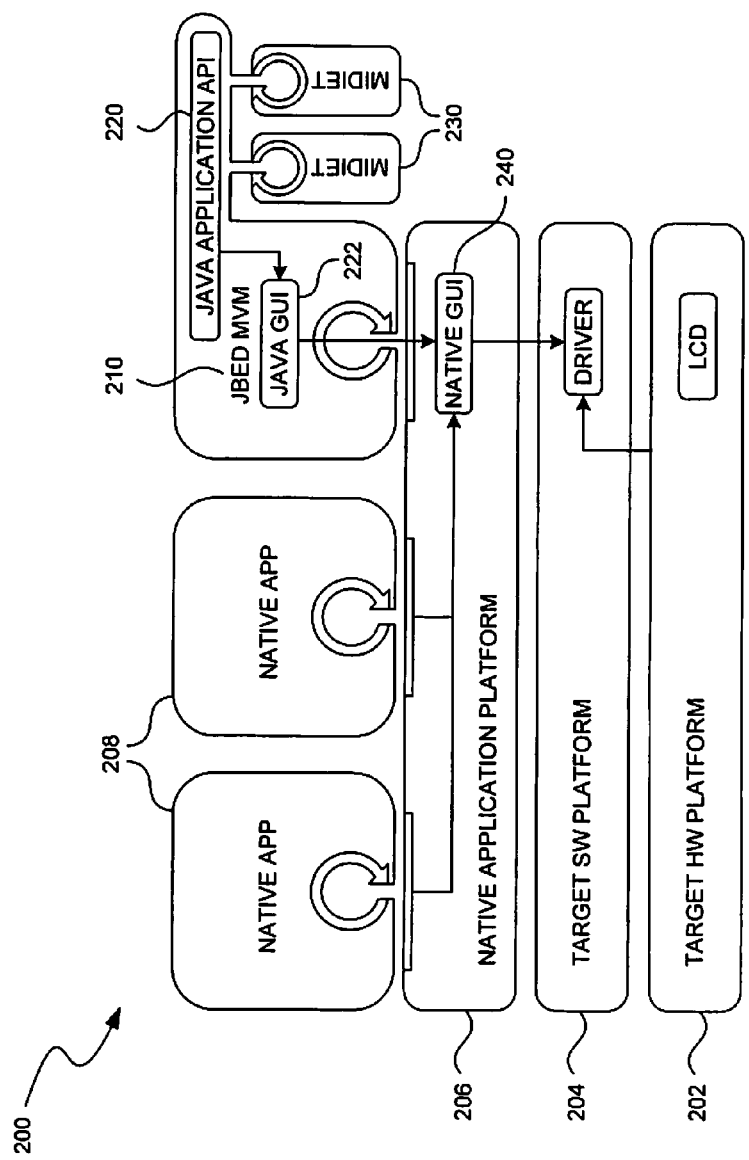
FIG. 4 is a pictorial block diagram of another Jbed mobile platform following yet another aspect of the present invention.

Turning next to FIG. 4, a graphical user interface ("GUI") implementation of a mobile platform 200 in accordance with another embodiment of the present invention. The mobile computing platform 200 includes a target hardware platform 202, a target software platform 204, a native application platform 206, a plurality of native applications 208, a multitasking virtual machine ("MVM") 210, and a plurality of MIDlets 230 coupled to the MVM 210. The MVM 210 includes a JAVA application API 220, and a JAVA GUI 222 occurs in the Jbed MVM 210. The GUI 222 of the Jbed MVM 210 ports through a native GUI 240 operating in the native application platform 206. Thus the GUI 222 is accessible to both the MIDlets 230 and the native applications 208.

Figure 5:
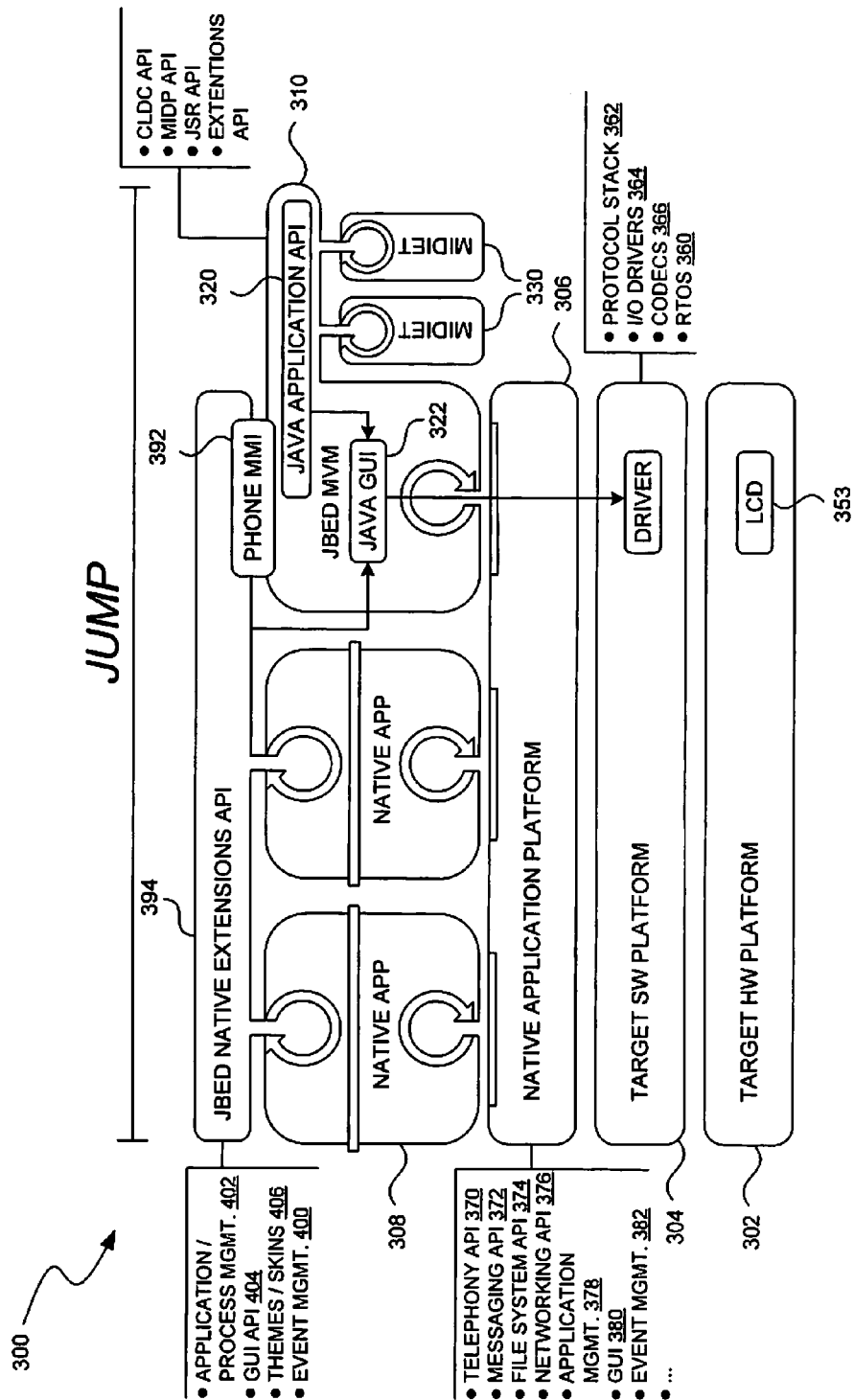
FIG. 5 is a pictorial block diagram of a Jbed Unified Mobile Platform (JUMP) in accordance with one embodiment of the present invention.

Turning next to FIG. 5, a cellular telephone 300 in accordance with another embodiment of the present invention will now be described. The telephone 300 includes a target hardware platform 302, a target software platform 304, a native application platform 306, a plurality of native applications 308, a multitasking virtual machine ("MVM") 310. The MVM 310 includes a JAVA application API 320, and a JAVA GUI 322. The GUI 322 of the Jbed MVM 310 ports through a native GUI operating in the native application platform 306. Thus the GUI 322 is accessible to both the MIDlets 330 and the native applications 308.

The target hardware platform 302 includes standard components found in a portable cellular telephone such as a terminal chipset, i/o peripherals such as LCD 353, and other terminal hardware. The target software platform 304 includes the operating system 360, protocol stack for communications 362, i/o drivers 364 (file system, camera, IRDA, media peripherals, etc.), codecs 366, and other software components integral to the cellular phone 300. The native application platform 306 includes a telephony API 370, a messaging API 372, a file system API 374, a networking API 376, a GUI 380, an event manager 382, and other native applications.

The MVM 310 includes an MVM porting layer enabling the MIDLETs 330 to operate within the native application platform 306. A phone man-machine interface (MMI) 392 is enabled through native extensions API 394 including an event manager 400, an application/process manager 402, a JAVA GUI API 404, and a brand manager API 406.

Figure 6:
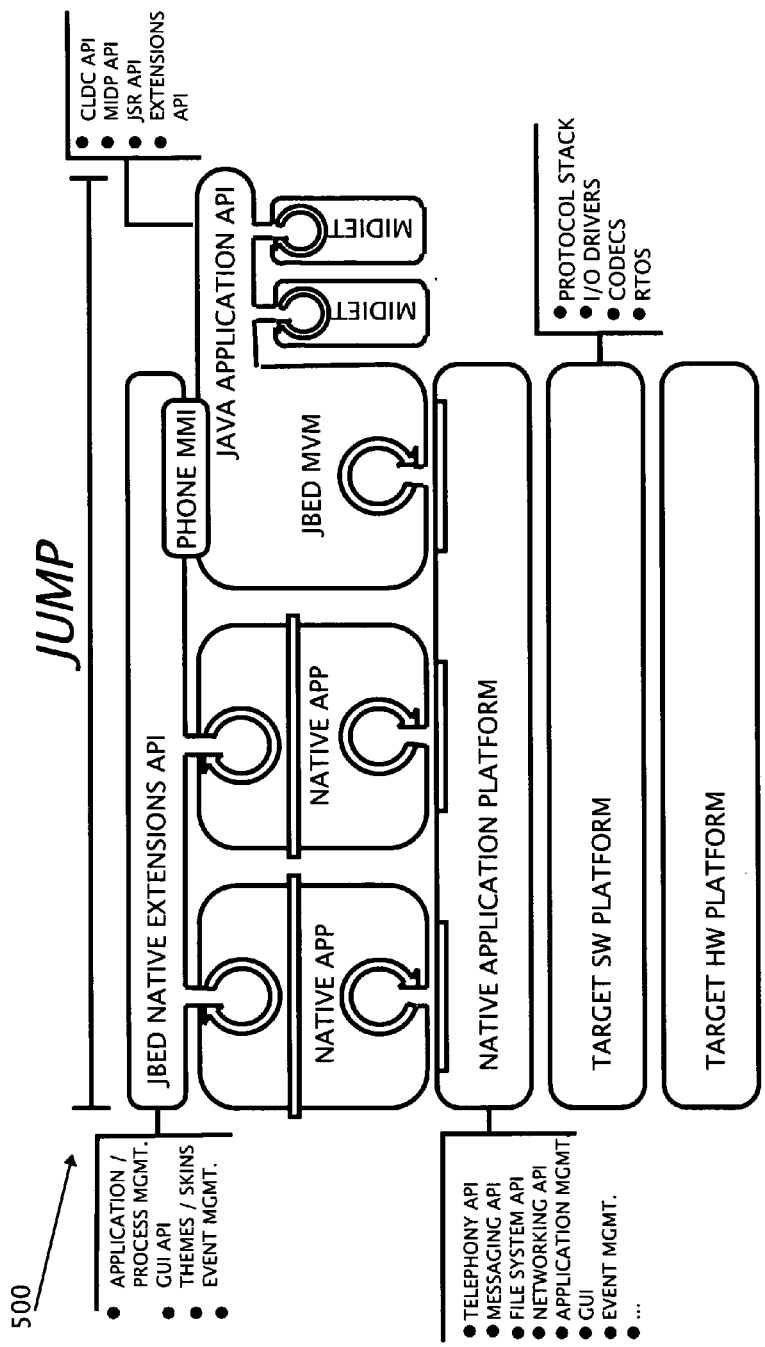
FIG. 6 pictorially illustrates a block diagram of a JUMP according to another embodiment of the present invention.

FIG. 6 illustrates another embodiment of a cellular telephone 500 that unlike the embodiment of FIG. 5 does not rely on an MVM GUI.

Figure 7:
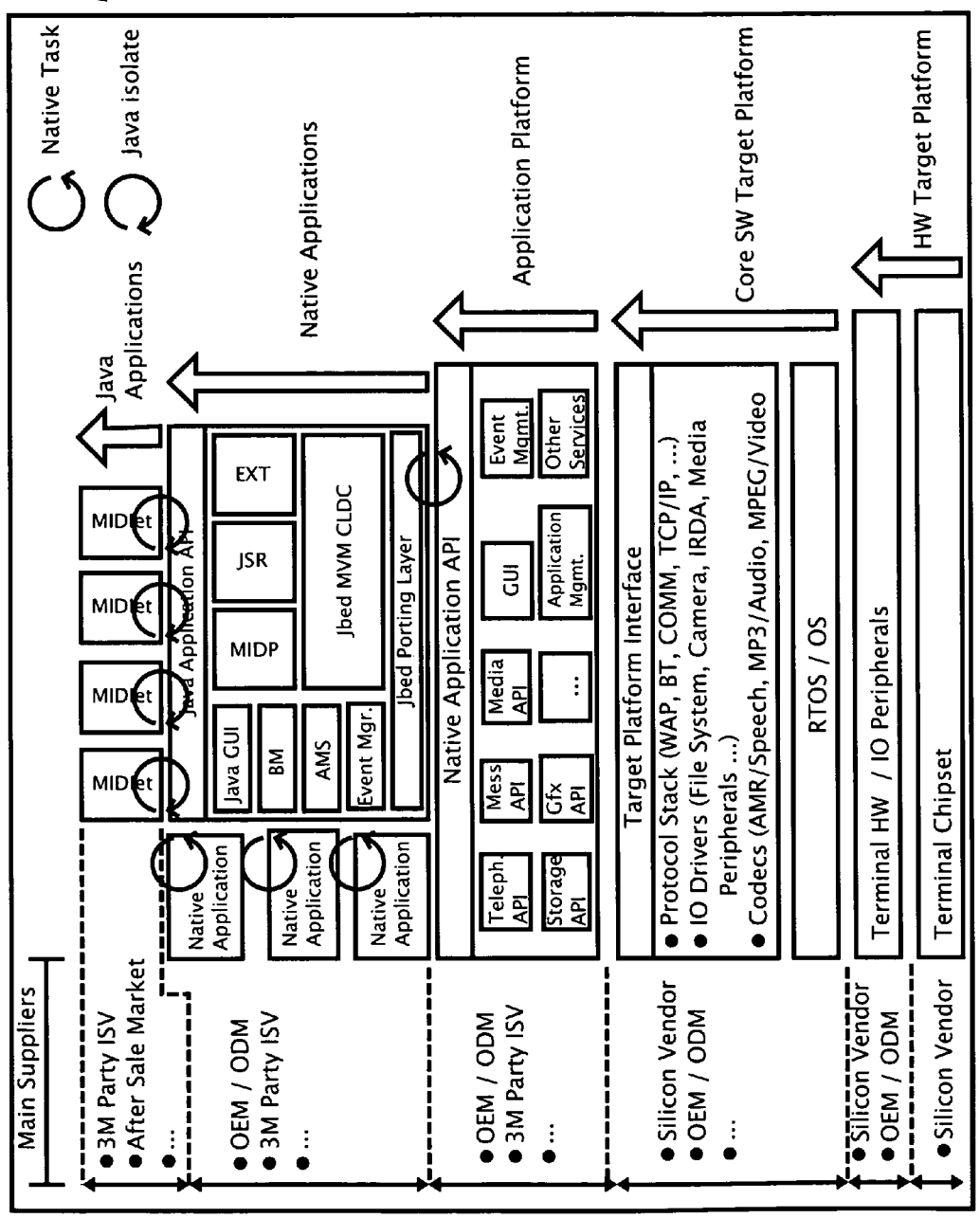
FIG. 7 pictorially illustrates yet another Jbed mobile platform following one perspective of the present invention.
Figure 8:
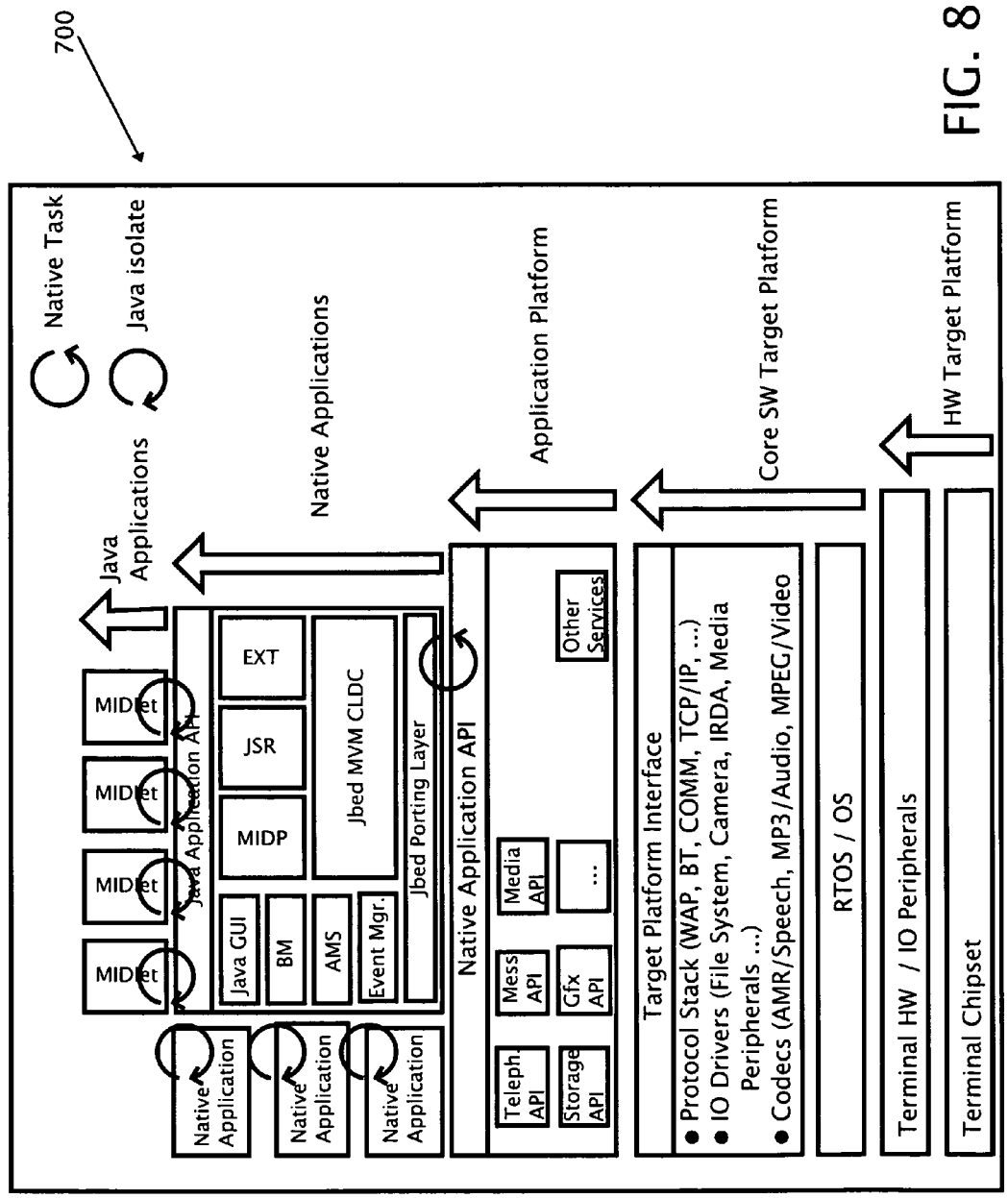
FIG. 8 pictorially illustrates another JUMP following one perspective of the present invention.

FIGS. 6-8 illustrate further embodiments of the present invention.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A mobile device comprising:
   a target hardware platform including a terminal chipset and peripherals;
   a target software platform including a protocol stack, i/o drivers, and a target platform interface;
   a native application platform including a native application API,
   a native application porting layer;
   a multi-tasking virtual machine (MVM) for encapsulating a native application in a MIDIet wrapper, such that said MVM recognizes the native application as a MIDIet and the native application can access MVM services, the MVM including:
      a multi-tasking manager;
      an event manager;
      a brand manager;
      a display manager;
      a JAVA application API enabling MIDIets to be installed through a combined verification and compilation process allowing compiled MIDIet code to be executed on said native application platform; and
      a porting layer for coupling said virtual machine with said native application platform, wherein said multi-tasking manager, said event manager, said brand manager, and said display manager replace equivalent functions in said native application platform, such that said event manager, said brand manager, and said display manager are accessible to both native applications in said native application platform and said MIDIets and such that implementation of the display manager occurs in the multi-tasking virtual machine rather than in the native application platform.

2. A mobile device as recited in claim 1, wherein said mobile device is a cellular telephone.

3. A mobile device as recited in claim 2 wherein said MVM further includes a phone man-machine interface (MMI) process.

4. A method for providing a unified mobile computing platform, the method being executed by a processor, said method comprising:
   implementing a multitasking environment by instantiating a multitasking virtual manager (MVM) that enables both JAVA and native applications of a native application platform to execute under a single application model and a single application management entity, and by encapsulating a native application in a MIDIet wrapper, such that the MVM recognizes the native application as a MIDIet and the native application can access MVM services; wherein, multi-tasking virtual machine (MVM) includes:
      a multi-tasking manager;
      an event manager;
      a brand manager;
      a display manager;
   implementing a JAVA GUI within said MVM;
   implementing a combined verification and compilation process during installation of JAVA byte-code; and
   porting said JAVA GUI through a native GUI such that said JAVA GUI is accessible to both MIDIets and native applications, such that display features of the multi-tasking virtual machine occurs in the multi-tasking virtual machine rather than in the native application platform.

5. A method as recited in claim 4, wherein said JAVA byte-code is found in MIDIets; and wherein, said MIDIets are pre-installed and are running constantly.

6. A method as recited in claim 5, wherein, said multi-tasking virtual machine (MVM) includes:
   a multi-tasking manager;
   an event manager;
   a brand manager;
   a display manager.

7. A method as recited in claim 4, wherein implementing a multitasking environment further includes coupling said MVM with a native application platform via a porting layer.

8. A method as recited in claim 4, wherein said multitasking virtual manager is a JBED embedded JAVA virtual machine MVM.

9. A method as recited in claim 4, wherein said MVM includes a brand manager, an event manager, and a JAVA GUI process.

10. A method for providing a unified mobile computer platform for a cellular telephone implementing a JAVA virtual machine, the method being executed by a processor, said method comprising:
   instantiating a JAVA multitasking virtual machine (MVM), wherein processes implemented within said MVM are installed through a combined verification and compilation process;
   instantiating a native application platform;
   implementing a JAVA GUI within said MVM;
   encapsulating the native application in a MIDIet wrapper, such that the MVM recognizes the native application as a MIDIet and the native application can access MVM services;
   switching control from a GUI within said native application platform to said JAVA GUI within said MVM;
   implementing an event manager within said MVM;
   executing a brand manager and a display manager within said MVM;
   implementing native applications within said native application platform, wherein said JAVA GUI is accessible to said native applications such that implementation of the display manager occurs in the multi-tasking virtual machine rather than in the native application platform; and
   installing MIDIets within said MVM, wherein said JAVA GUI is accessible to said MIDIets.

* * * * *